(12) United States Patent
Manna

(10) Patent No.: US 10,984,170 B2
(45) Date of Patent: Apr. 20, 2021

(54) SYSTEMS AND/OR METHODS FOR DYNAMIC LAYOUT DESIGN

(71) Applicant: Software AG, Darmstadt (DE)

(72) Inventor: Subham Manna, West Bengal (IN)

(73) Assignee: SOFTWARE AG, Darmstadt (DE)

(*) Notice: Subject to any disclaimer, the term of this patent is extended or adjusted under 35 U.S.C. 154(b) by 162 days.

(21) Appl. No.: 16/232,186

(22) Filed: Dec. 26, 2018

(65) Prior Publication Data

US 2020/0210518 A1 Jul. 2, 2020

(51) Int. Cl.
| | | |
|---|---|---|
| G06F 40/106 | (2020.01) | |
| G06F 3/0484 | (2013.01) | |
| G06F 16/958 | (2019.01) | |
| G06F 8/38 | (2018.01) | |
| G06F 40/14 | (2020.01) | |
| G06F 40/166 | (2020.01) | |

(52) U.S. Cl.
CPC ........ *G06F 40/106* (2020.01); *G06F 3/04845* (2013.01); *G06F 8/38* (2013.01); *G06F 16/986* (2019.01); *G06F 40/14* (2020.01); *G06F 40/166* (2020.01); *G06F 2203/04803* (2013.01)

(58) Field of Classification Search
CPC .......... G06F 16/95; G06F 40/00; G06F 16/20; G06F 16/30; G06F 3/048; G06F 16/80; G06F 40/106; G06F 40/14; G06F 40/166; G06F 3/04845; G06F 16/986; G06F 8/38; G06F 2203/04803; G06F 40/131
See application file for complete search history.

(56) References Cited

U.S. PATENT DOCUMENTS

| | | | | |
|---|---|---|---|---|
| 6,874,128 B1* | 3/2005 | Moore | ................. | G06F 3/0486 715/759 |
| 8,438,495 B1* | 5/2013 | Gilra | ...................... | G06F 40/14 715/781 |
| 2002/0188636 A1* | 12/2002 | Peck | ..................... | G06F 40/166 715/255 |
| 2004/0160462 A1* | 8/2004 | Sheasby | ................. | G06T 11/60 715/788 |
| 2005/0237321 A1* | 10/2005 | Young | .................... | G06F 9/451 345/418 |
| 2011/0238612 A1* | 9/2011 | Wilson | ................... | G06N 7/005 706/52 |

(Continued)

OTHER PUBLICATIONS

Jvider, retrieved Dec. 26, 2018, 2 pages. http://www.jvider.com/.

(Continued)

*Primary Examiner* — Sanchita Roy
(74) *Attorney, Agent, or Firm* — Nixon & Vanderhye, P.C.

(57) ABSTRACT

Certain example embodiments relate to systems and/or methods for dynamic layout designs of webpages, screens, and/or the like. A user is able to define a layout during a user experience design phase simply and without needing knowledge of programming. Simple actions allow the user to define divisions, and the divisions are maintained in a document object model (DOM) representation and shown visually. The DOM representation may be transformed into code suitable for use as a webpage, application, or the like. Certain example embodiments advantageously produce consistent and efficient code that is modular and responsive.

28 Claims, 11 Drawing Sheets
(9 of 11 Drawing Sheet(s) Filed in Color)

(56) References Cited

U.S. PATENT DOCUMENTS

| | | | | |
|---|---|---|---|---|
| 2012/0254733 | A1* | 10/2012 | Tucovic | G06F 40/106 715/243 |
| 2013/0293483 | A1* | 11/2013 | Speranza | G06F 3/0488 345/173 |
| 2016/0092084 | A1* | 3/2016 | Dyar | G06F 3/0481 715/765 |
| 2016/0320962 | A1* | 11/2016 | Bellamy | G06F 3/017 |

OTHER PUBLICATIONS

Tkinter 8.5 Reference: A GUI for Python, Dec. 31, 2013, 168 pages. http://infohost.nmt.edu/tcc/help/pubs/tkinter/tkinter.pdf.
Bootstrap—Home, retrieved Dec. 26, 2018, 2 pages. https://getbootstrap.com/.
Bootstrap—Grid System, retrieved Dec. 26, 2018, 2 pages. https://getbootstrap.com/docs/4.1/layout/grid/.
MDN Web Docs—Relationship of Grid Layout to Other Layout Methods, retrieved Dec. 26, 2018, 17 pages. https://developer.mozilla org/en-US/docs/Web/CSS/CSS_Grid_Layout/Relationship_of_Grid_Layout.
Wordpress, retrieved Dec. 26, 2018, 5 pages. https://wordpress.com/.
Angular, retrieved Dec. 26, 2018, 3 pages. https://angular.io/.
React, retrieved Dec. 26, 2018, 7 pages. https://reactjs.org/.
Vue.js—The Progressive JavaScript Framework, retrieved Dec. 26, 2018, 3 pages. https://vuejs.org/.

* cited by examiner

| Section 1 | Section 2 | Section 3 | Section 4 | Section 5 |

SYSTEMS AND/OR METHODS FOR DYNAMIC LAYOUT DESIGN

TECHNICAL FIELD

Certain example embodiments described herein relate to user interface (UI) creation tools. More particularly, certain example embodiments described herein relate to systems and/or methods for dynamic layout design that may be used in connection with UI creation tools.

BACKGROUND AND SUMMARY

Today, people interact with the "digital world" using user interfaces (UIs). Application programs, mobile applications, web-sites, web-applications, etc., all use UIs as front-end parts to communicate and/or "interact" with users. Typically, front-end development begins from the user experience (UX) design perspective. After UX design, UI developers generally prototype the front-ends.

Some current application program frameworks provide graphical user interface (GUI) based UI modeling for front-end UI design. GUI-based UI modeling these days is quite simple and typically "developer friendly." Mobile application frameworks also are moving in the direction of GUI-based UI modeling and also are "developer friendly." These current computer-based tools have been beneficial in enabling quite complex UIs to be developed rather easily, especially compared to earlier tools where UI design was a much more manual and involved process.

Further improvements still are possible, however, as current computer-based tools are by their nature designed to be "developer friendly." This developer-friendly approach in effect means that the person creating the UI unfortunately more or less needs to have at least some programming knowledge. Yet there is a trend towards enabling non-technical users to design UIs. For instance, there is a current trend towards enabling end-users, who have no knowledge of programming, to create UIs using web-builder sites.

In modern technology, page or screen layout typically is developed either using a grid system or some static layout system. Most current UI development application programs use the grid system, whereas most web-based UI development approaches use grid or static approach or combination thereof.

"Layout" in this sense refers generally to the part of graphic design that deals in the arrangement of visual elements on a page. Layout usually is understandable in terms of some number of sections, panels, or the like, throughout a given page or screen, potentially as per requirements for the underlying application. One purpose of a layout is to help separate the relevant "things" or elements of the user interface. When designing a page, for example, it oftentimes is best practice to figure out the relevant elements and then place them in the suitable layout.

Grid systems typically calculate the structure of a layout using its predefined coordinate system. The whole page has some rows and columns that define the coordinates, and the drawn layout's position is noted throughout the coordinates. Jvider, for example, is a visual interface designer for Java and uses a grid system. Using Jvider, a user can draw layouts, elements, panels, etc., and they are notated using coordinates. As another example, Tkinter is Python's de facto standard GUI package, which provides a code-based grid system. As still another example, Bootstrap's column grid system allows up to 12 columns across the page. Users can combine one of four defined classes (targeting phones, tables, small laptops, and larger laptops/desktops) to create more dynamic and flexible layouts, but all are handled by a grid mechanism. In a more web-based context, both the cascading style sheet (CSS) and flex layout approach provide code-based grid layout systems and potentially allow for responsive behavior. Flex offers a 1D flow of the contents, whereas CSS offers 2D flow of the content. They use the grid layout to achieve the responsive behavior. Advantages of this system include its being very user friendly, lower requirement for coding knowledge in GUI-based implements, etc. Disadvantages, however, relate to the fact that its perfection depends on predefined coordinate density. Here, perfection and density of the coordinates are directly proportional.

In static systems, as the name suggests, the application has some predefined layouts called templates. A user can choose and use the predefined templates, e.g., as per requirements. Template based web-builders, for example, typically operate using template-based webpages, in which a user can choose and modify a page template. The page layout is static, meaning that the basic structure of the page is fixed and the user can modify only the text, image, size of the elements, etc. There are a number of companies with similar providers including, for example, Wix.com, WordPress.com, webflow, Clickbooq, Cloudpress, Cloudward, Designmodo (generator), Designmodo (slides), Designmodo (startup), Duda, Everdwell, Go.themeforest, IMcreator, Jimdo, LightCMS, LiveControl, Macaw, Made for Food, Mobirise, Motocms, ThemifyFlow, Trucks, ONTRApages, Optimizepress, Pagevamp, Pikock/Orson, Pinegrow, Pivot, Pixpa, Readymag, Shopify, Sidengo, Simbla, SiteKit, SnackWebsites, Splash, SquareSpace, StackHive, Strikingly, uCoz, uKit, Voog, Webflow, Webiny, WebsiteBuilder, Webydo, Weebly, Weebly Carbon, Weld, Weps, Yola, etc. One advantage of this system is that almost nothing has to do be done by users, but such systems oftentimes force users to compromise with their desired layout structures.

There are at least some existing solutions that use a combination of these two layout systems to provide for more user-friendly behavior. Microsoft PowerPoint, for example, enables a user to choose a predefined static layout and, after that, the user can place elements into the desired section in a grid-based manner. The predefined static layout can actually be a blank slide.

In keeping with the trend towards creating more powerful layouts in an easier manner, it would be desirable to expand the base of people able to create UIs to those lacking programming knowledge, e.g., bridging the gap between UX design and UI development. For example, it would be desirable to enable users, and potentially even end-users, to create UIs that are dynamic (e.g., "responsive" to resize and/or other operations) and that can be used for UIs of potentially any kind of application displayable via potentially any type of device. It furthermore would be desirable to create layouts in a simple way, e.g., via a well-designed UI, that supports the underlying operation, while providing dynamic features, separating out technical design from graphical layout, and automatically producing simple, consistent and repeatable (e.g., deterministic), and well-defined code output.

Certain example embodiments improve upon the above-described approaches and provide the above-described and/or other features. For instance, certain example embodiments help bridge the gap between UX design and UI development, enabling users, and potentially even end-users, to create UIs that are dynamic (e.g., "responsive" to resize and/or other operations) and that can be used for UIs of potentially any kind of application displayable via potentially any type of device.

In certain example embodiments, the layout of the page or screen will be defined dynamically, as per a background calculation. The dynamic layout depends on the whole page/screen or section thereof where the layout is getting placed. This technique offers a number of advantages. For example, certain example embodiments permit on-the-fly creation of a template file (e.g., an HTML template file). While the end user designs the template, it is created and rendered in real time by the application or a browser, e.g., in a WYSIWYG (What You See Is What You Get) manner. Another advantage relates to the fact that any kind of complex layout structure that user can achieve by hand-coding is also possible to achieve by some sort of key and/or mouse events, providing a more user-friendly approach to UI design, e.g., at the UX stage. Page modularity advantageously also can be realized. In page modularity, one or more pages can integrated within the well-defined page structure, even in the absence of separate rules specific for handling the modularity.

Still another advantage relates to enabling a document object model (DOM) hierarchy to be well-defined, e.g., so the DOM elements can be handled programmatically. Efficient rendering can be realized as a result of the well-defined DOM. Still another advantage relates to in-built page accommodation as per screen-size, e.g., so the layout structure can be changed relatively as per different screen sizes that may be used to display the layout. In a related regard, responsiveness (e.g., to resize operations) can be handled by an existing grid-based solution (which in some instances can be an automatically-responsive solution) and/or by designing separate pages (e.g., through a custom-responsive solution).

In certain example embodiments, a method of creating a structured page is provided. A page object corresponding to a document object model is initialized. Operation instructions are received from a user in connection with a designer application executed by a computing system including at least one processor and a memory, with the designer application providing a drawing canvas having upper, lower, left, and right edges, and with the drawing canvas being displayable via a display operably coupled to the computing system. For each received operation instruction, a determination is made as to whether the respective operation instruction matches one of a plurality of predefined types. Responsive to a determination that the respective operation instruction matches a first predefined type, a predefined section in the drawing canvas in which the respective operation instruction is provided is identified. Responsive to there being no identified predefined section, the method includes: determining how far from the edges of the drawing canvas the respective operation instruction is provided; responsive to a determination that the respective operation instruction is provided within a first distance of the left or right edge of the drawing canvas, creating a horizontal division in the drawing canvas, the horizontal division extending across the drawing canvas at a height location corresponding to where the respective operation instruction is provided, the horizontal division creating upper and lower sections in the drawing canvas, and adding to the page object new objects corresponding to the upper and lower sections, the new objects having associated therewith respective height and width information; and responsive to a determination that the respective operation instruction is provided within a second distance of the upper or lower edge of the drawing canvas, creating a vertical division in the drawing canvas, the vertical division extending across the drawing canvas at a width location corresponding to where the respective operation instruction is provided, the vertical division creating left and right sections in the drawing canvas, and adding to the page object new objects corresponding to the left and right sections, the new objects having associated therewith respective height and width information. Otherwise, the method includes: determining how far from the edges of the identified predefined section the respective operation instruction is provided; responsive to a determination that the respective operation instruction is provided within the first distance of the left or right edge of the identified predefined section, creating a horizontal division in the identified predefined section, the horizontal division extending across the identified predefined section at a height location corresponding to where the respective operation instruction is provided, the horizontal division creating upper and lower sections in the identified predefined section, and adding to the page object, as child objects of the object representing the identified predefined section, new objects corresponding to the upper and lower sections, the new objects having associated therewith respective height and width information; and responsive to a determination that the respective operation instruction is provided within a second distance of the upper or lower edge of the identified predefined section, creating a vertical division in the identified predefined section, the vertical division extending across the identified predefined section at a width location corresponding to where the respective operation instruction is provided, the vertical division creating left and right sections in the identified predefined section, and adding to the page object, as child objects of the object representing the identified predefined section, new objects corresponding to the left and right sections, the new objects having associated therewith respective height and width information. Responsive to a determination that the respective operation instruction matches a second predefined type, code corresponding to the structured page based on the page object is generated.

According to certain example embodiments, further user input may be solicited or prompted for to disambiguate whether to create a horizontal or vertical division and associated objects, responsive to (a) a determination that a given operation instruction is provided within the first distance of the left or right edge of the drawing canvas and within the second distance of the upper or lower edge of the drawing canvas, and responsive to (b) a determination that the given operation instruction is provided within the first distance of the left or right edge of a given identified predefined section and within the second distance of the upper or lower edge of the given identified predefined section.

According to certain example embodiments, the first and second distances may be the same as one another. According to certain other example embodiments, responsive to there being no identified predefined section, the first distance may be defined as a percentage of the width of the drawing canvas and the second distance may be defined as a percentage of the height of the drawing canvas; and otherwise, the first distance may be defined as a percentage of the width of the identified predefined section and the second distance is defined as a percentage of the height of the identified predefined section.

According to certain example embodiments, the height and width information for objects may be defined in terms of percentages.

According to certain example embodiments, an intermediate representation of the structured page being created may be maintained, as sections are being created and prior to the generation of the code. For instance, the intermediate representation, and/or at least a part of the generated code, may be in an HTML format. In this regard, in certain example embodiments, each created section in the intermediate representation and/or in the generated code may be represented in connection with a pair of <div> and </div> tags. According to certain example embodiments, the intermediate representation of the structured page may include a combination of structural elements and at least one design style, and the generated code may at least partially separate the structural elements from the design style(s) in the combination. For instance, the generated code may include HTML and CSS code.

According to certain example embodiments, the user may be able to orient additional elements within the structured page being created, using the designer application.

According to certain example embodiments, the structured page is generated to be automatically responsive to resizing. A custom-defined responsiveness approach may be used in certain example embodiments, e.g., with the custom-defined responsiveness approach being defined in connection with a style sheet generated as part of the code generation.

According to certain example embodiments, the page object may be maintained as a strict binary tree. For instance, the objects in the page object may be namable in accordance with a naming convention, with the naming convention for each non-root object indicating the respective object's parent object(s) and whether the respective object is a horizontal or vertical section.

According to certain example embodiments, a recovery stack including a first-in-last-out ordering of elements representing user actions pertaining to section creation and undo and redo user operations may be maintained.

In certain example embodiments, a method of creating a structured page is provided. A page object from which the structured page is to be generated is initialized, with the page object being maintained in memory as a strict binary tree. A first binary partition is defined in a drawing canvas in response to a first received partition instruction, with the drawing canvas being provided in connection with a designer application executed by a computing system including at least one processor, with the first binary partition being represented in the page object as first and second objects that are sub-objects of a root object representing the drawing canvas as a whole, and with the first and second objects having associated therewith a first partition type that is set based on where the first received partition instruction is provided relative to the canvas. Responsive to each further received partition instruction, an associated specified partition is identified and a further binary partition is defined therein, with each further binary partition being represented as first and second sub-objects of the object representing the associated specified partition, the first and second sub-objects having associated therewith a paired partition type that is set based on where the respective further received partition instruction is provided relative to the associated specified partition. Code corresponding to the structured page is generated based on the page object. A naming convention is applicable to the objects in the page object, with the naming convention specifying, for a given object, the respective parent object(s) thereof and the respective partition type associated therewith, the naming convention being used in the generated code.

According to certain example embodiments, each object may have a height property and a width property associated therewith; and each partition instruction may cause the first and second objects associated therewith to have a partition type that indicates that one of the height property and the width property is set at 100% for both of those objects and the other of the height property and the width property totals to 100% for both of those objects.

According to certain example embodiments, an intermediate representation of the structured page being created may be maintained, as partitions are being created and prior to the generation of the code. For instance, the intermediate representation, and/or at least a part of the generated code, may be in an HTML format. In certain example embodiments, the intermediate representation of the structured page may include a combination of structural elements and at least one design style, and the generated code may at least partially separate the structural elements from the design style(s) in the combination.

According to certain example embodiments, the naming convention may be used in the intermediate representation.

According to certain example embodiments, the drawing canvas and partitions therein may be rendered via a browser.

According to certain example embodiments, partition instructions may be provided via mouse clicks.

In addition to the features of the previous paragraphs, counterpart systems, non-transitory computer readable storage media tangibly storing instructions for performing such methods, executable computer programs, and the like, are contemplated herein, as well.

These features, aspects, advantages, and example embodiments may be used separately and/or applied in various combinations to achieve yet further embodiments of this invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages may be better and more completely understood by reference to the following detailed description of exemplary illustrative embodiments in conjunction with the drawings, of which.

DETAILED DESCRIPTION

Figure 1:
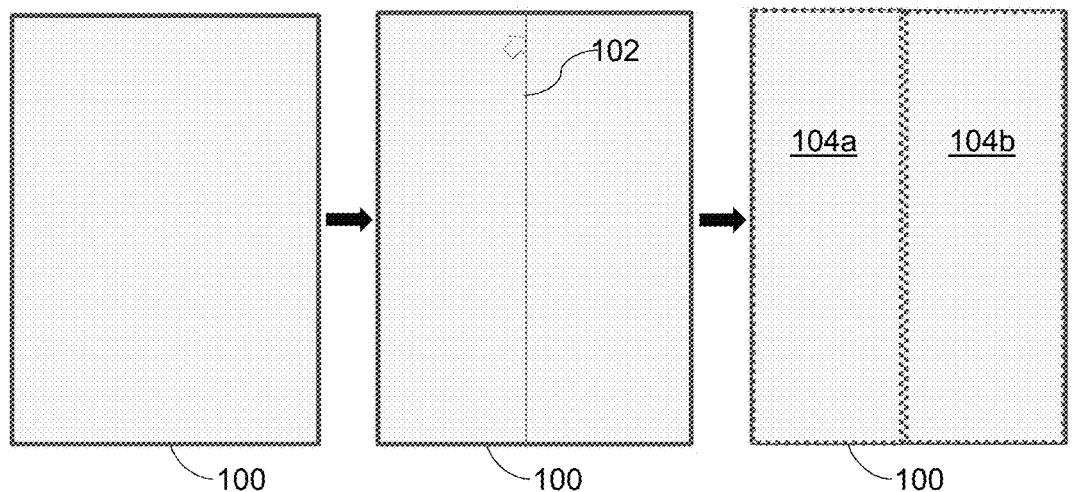
FIG. 1 helps demonstrate how a vertical division can be created in a drawing canvas in accordance with certain example embodiments.

Certain example embodiments described herein relate to systems and/or methods for dynamic layout design that may be used in connection with user interface (UI) creation tools. The techniques of certain example embodiments advantageously bridge the gap between user experience (UX) design and UI design, potentially enabling a broader array of users to participate in UI creation.

As will be appreciated from the above, a static layout approach has to perform calculations for layout design, whereas a grid layout approach has been calculated as per predefined grids and/or coordinates. A semi-dynamic layout calculates positions relative to the screen's border and, thus, uses relative positions.

In certain example embodiments, a dynamic mechanism is used to calculate layouts with respect to the entire page/screen or section. In certain example embodiments, layouts may be nested and are well-defined in nature, thereby facilitating complex design. Certain example embodiments calculate 100% width and 100% height of any section, thereby helping to ensure that the layout fits in any (or virtually any) screen size that offers good accommodation. Responsive behavior can be achieved automatically by selecting from a predefined responsiveness approach, and/or by drawing separate layouts for separate screen size, etc. As with current approaches, the pages/screens created by certain example embodiments also ensure that a so-created whole page/screen is considered as a single module and anything changed on the page/screen has an effect on the whole page. But here, however, the layout offers modularity in the sense that each section may be considered separate from others within a single page/screen. Thus, any change in one section does not necessarily affect other sections. This modularity is useful for efficient page rendering, and an issue in rendering one section does not affect the rendering of the other sections. Responsiveness can be handled by designing separate page layouts and/or applying predefined responsiveness approaches for different screen sizes, etc., even on a modular basis.

The following table compares the performance of different layout approaches, highlighting the technical advantages of the dynamic layout approach of certain example embodiments. In the table, bolded entries are considered the best, standard font entries are considered average, and italicized entries are considered the worst.

As per the above comparison table, for static layout, the design time and background computation time is negligible because everything is already defined. User-friendliness, learning-curve, and pre-knowledge are good because for similar reasons. Yet the ability to achieve perfection and customizations in design is potentially severely limited, even though these attributes oftentimes are in the highest demand when it comes to layout design.

A GUI-based grid system takes a "usual" or seemingly standard computation time to generate the GUI corresponding to the background code. Yet the user needs more time to design the layout compared to a static or dynamic layout approach. Nonetheless, this approach may support a large amount of customization, e.g., as a user typically can modify elements using drag-n-drop, key and/or mouse, and/or other activities. Perfection is good but not best, as it is proportionally related to the grid-density. That is, if there is a larger number of coordinates, then the layout will be more perfect. The overall system nonetheless is very user-friendly, as the required pre-knowledge is very low and the learning curve typically will be "medium" in comparison with the other listed technologies.

Compared to the GUI-based grid system, code-based grid layout is much more complex, as a user typically must have programming knowledge. As a result, the pre-knowledge required, learning curve, and user-friendliness, typically will not be good. Other comparison parameters like computation, customization, design time effort, and perfection generally will follow the GUI-based grid system approach.

A semi-dynamic mechanism mostly is used in the mobile app layout design context. The amount of computation to generate the background code corresponding to the UI is medium compared to the other listed approaches. However, a user typically will need more time and/or effort to design the layout compared to the static or dynamic layout. And the learning curve, user-friendliness, pre-knowledge required are not good because it is code based. Its perfection nevertheless is good compared to the other layout approaches, except for the dynamic layout approach.

The dynamic layout of certain example embodiments has a potentially high computation requirement compared to the other layouts. However, this concern is not really the user's burden; instead, it is a machine concern. The layout design time is better than the grid system or semi-dynamic system. Perfection can be is maximum, and full customization can be supported. And there is no need for special coding knowledge, as simple drag-n-drop, key-and-mouse, and/or other activities may be sufficient for powerful layout design. It thus is a very user-friendly system, with a simple learning-curve and low pre-knowledge requirement.

The pre-knowledge requirement may be implementation specific. For example, as described in the example imple-

|  | Static Layout | Grid Layout (GUI Based) | Grid Layout (Code Based) | Semi-Dynamic Layout | Dynamic Layout |
| --- | --- | --- | --- | --- | --- |
| Computation | None | Usual | Usual | Medium | Complex |
| Design Time Effort | None | High | High | High | Medium |
| Customization | No Option | Full | Full | Full | Full |
| Perfection | No Option | Medium | Medium | High | High |
| User Friendly | Max | Max | None | None | Max |
| Learning Curve | None | Medium | Large | Large | Very Short |
| Pre-knowledge | None | Very Less | High | High | None | mentation below, to obtain any division (vertical or horizontal), the user merely right-clicks. In this example implementation, to obtain a vertical division, the user determines where the partition line is to be placed, moves the mouse pointer to that line (either at an upper or lower portion thereof), and simply right-clicks using the mouse. Similarly, in this example implementation, to obtain a horizontal division, the user determines where the partition line is to be placed, moves the mouse pointer to that line (either at a left or right portion thereof), and simply right-clicks using the mouse.

Example Implementation

Details concerning an example implementation are provided below. It will be appreciated that this example implementation is provided to help demonstrate concepts of certain example embodiments, and aspects thereof are non-limiting in nature unless specifically claimed. For example, descriptions concerning example division or partition types, example layout commands, mouse and/or keyboard actions used for accomplishing example layout commands, implementation rules, DOM objects, implementation phases, naming conventions, etc., are non-limiting in nature unless specifically claimed.

In certain example embodiments, a drawing canvas is provided. The canvas represents the entire page/screen to be generated. The canvas is divided into sections, and sections are dividable as well. The user can insert design elements into the canvas and/or a section thereof. These design elements can be text, graphic, video, user-interface (e.g., radio button, dropdown list, button, etc.), and/or other design elements. An entire page or screen can be inserted into a single section in certain example embodiments, in accordance with the modular approach described herein.

In certain example embodiments, the divisions are binary divisions. Thus, when the user defines a section, two divisions are generated to fill-up the whole page/section. If the divisions are placed horizontally, then the width of each individually will be 100%, and sum of the divisions' height will be 100%. Similarly, if the divisions are placed vertically, then height of each individual division will be 100%, and the sum of both divisions' width will be 100%.

Figure 2:
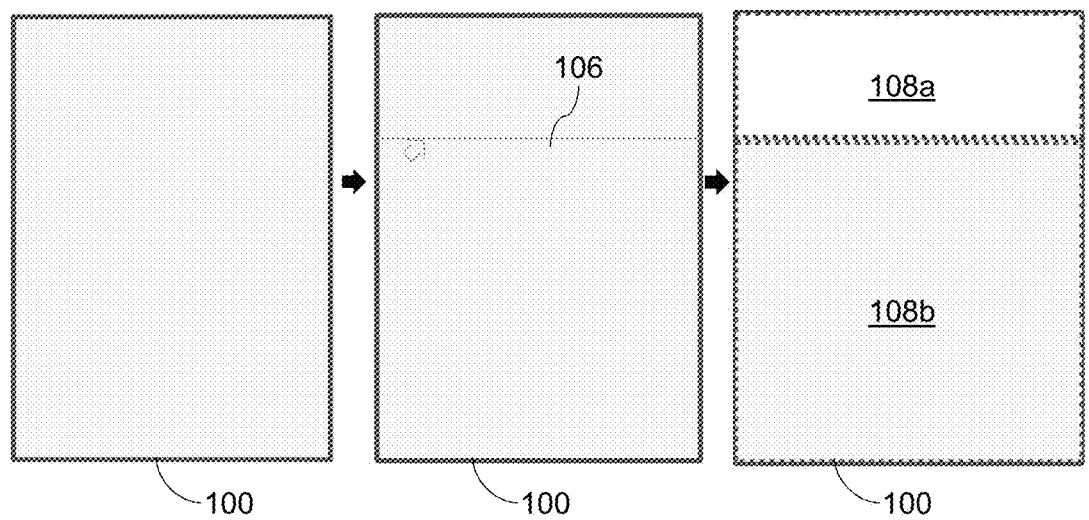
FIG. 2 helps demonstrate how a horizontal division can be created in a drawing canvas in accordance with certain example embodiments.

FIGS. 1-2 visually demonstrate this partitioning. In FIG. 1, the drawing canvas 100 is undivided. The user positions the mouse cursor (indicated by the arrow) near the top of the canvas 100 and right clicks, indicating that sections should be created on either side of the vertical line 102. This creates first and second vertical sections 104a and 104b. In FIG. 1, the height of each of the first and second vertical sections 104a and 104b is 100%, and the width of the first and second vertical sections 104a and 104b totals to 100%. Similarly, in FIG. 2, the user positions the mouse cursor (indicated by the arrow) near the left side of the canvas 100 and right clicks, indicating that sections should be created on either side of the horizontal line 106. This creates first and second horizontal sections 108a and 108b. In FIG. 2, the width of each of the first and second horizontal sections 108a and 108b is 100%, and the height of the first and second horizontal sections 108a and 108b totals to 100%.

Figure 3:
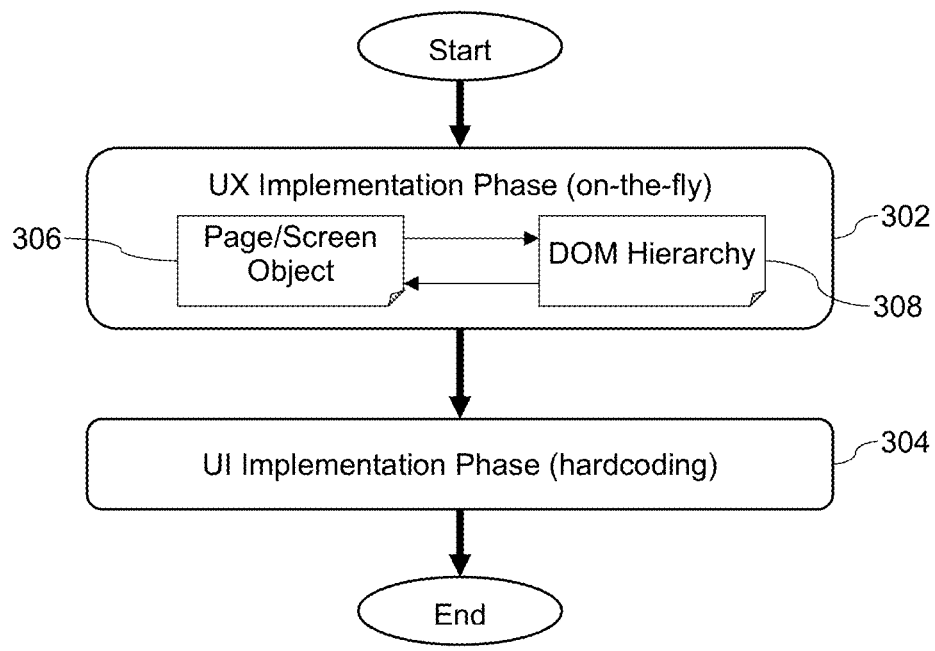
FIG. 3 is a state diagram showing how the dynamic layout design techniques may be implemented in connection with certain example embodiments.

FIG. 3 is a state diagram showing how the dynamic layout design techniques may be implemented in connection with certain example embodiments. As can be seen from FIG. 3, the first state or phase 302 involves the user defining the UX, and the second state or phase 304 involves the UI implementation. Within the UX design phase 302, a master page/screen object 306 and a document object model (DOM) hierarchy (e.g., a DOM tree) 308 are maintained, simultaneously and consistently. Details concerning these states or phases are provided, below.

Figure 4:
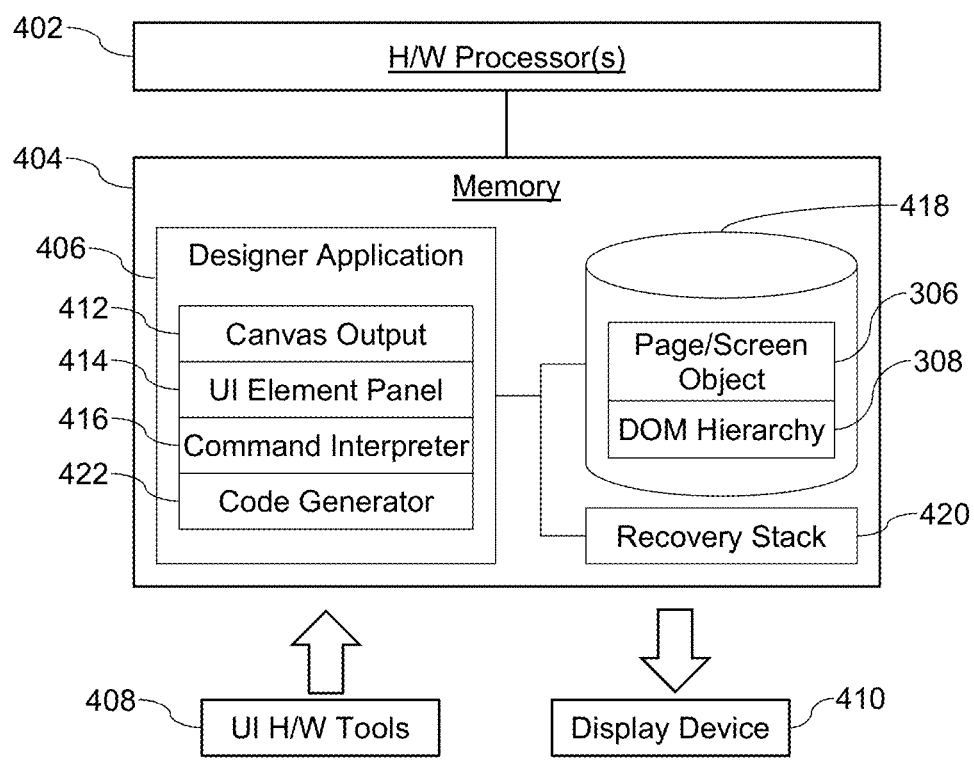
FIG. 4 is a high-level block diagram demonstrating an example computer architecture that may be used in certain example embodiments.

FIG. 4 is a high-level block diagram demonstrating an example computer architecture that may be used in certain example embodiments. One or more hardware processors 402 are operably coupled to memory 404, which tangibly stores instructions that, when executed, run a designer application 406. A user is able to interface with the designer application 406 using UI hardware tools 408 such as, for example, a mouse, keyboard, etc. Output from the designer application is provided to the display device 410. The output includes, for example, a drawing canvas output by the canvas output module 412. The user can use the UI hardware tools 408 to edit the drawing canvas, e.g., to add divisions as described above. The user also can use the UI hardware tools 408 to add UI elements to the canvas using a UI element panel tool 414. This may involve, for example, dragging and dropping elements onto the canvas in a section, creating text boxes and adding text, selecting an image file, etc. The UI element panel tool 414 may in some instances enable the user to specify DOM-compliant objects, attributes, and/or the like, for inclusion in the canvas. This on-the-fly creation and display functionality advantageously enables for example, recovery, modification, undo/redo, and/or other operations to be realized.

The command interpreter 416 receives input from the UI hardware tools 408 reflecting changes to the canvas, etc., and ensures that the canvas output module 412 updates the display provided to the display device 410. It also helps maintain in a database 418 the page/screen object 306 and the DOM hierarchy 308. In certain example embodiments, an intermediate representation may be used to provide output to the display device 410, e.g., as described in greater detail below. In certain example embodiments, the page/screen object 306 and/or the DOM hierarchy 308 may be used in this regard. Actions taken by the user are pushed to the recovery stack 420 so that the user can undo/redo operations.

The code generator 422 generates code (e.g., HTML code, a CSS, and/or the like) upon a user instruction (e.g., when the user has finished creating the UI). Thus, the user draws the layout with a blank page or blank canvas. In certain example embodiments, there are no limitations on the divisions that can be introduced, and nest sections may be supported. The whole page/screen layout may be created on-the-fly during this first phase.

Initially, there is a blank page/screen object with zero children. After that, assume that the user triggers an event to get a horizontal division. As a result, two child objects will be dynamically created under the parent or root object. Both of the children's width will be set to 100%, and the sum of the height of the two children will be 100%. Conversely, if a vertical division is triggered, then two child objects will be dynamically created under the parent or root object. Both of the children's height will be set to 100%, and the sum of the width of the two children will be 100%.

Now, two divisions correspond to the on-the-fly page layout, which will be dynamically appended to the DOM to visualize the layout on the page. This is not, however, the actual hardcoded layout (which is generated in the next phase). If the user triggers another division layout event, the corresponding action as that discussed above will be performed. It will be appreciated that these actions/page layout events are very consistent. Whatever change is made by the first action is reflected when the second action is made.

After the layout is designed, when the user saves the page/screen, the on-the-fly page structure is converted into code through hardcoding. That is, the code generator 422 may, in the actual implementation phase, "execute" the on-the-fly page structure and convert it into a corresponding hardcoded layout page. First, the page object is transformed with its necessary properties, and then the page object is executed with the hardcoded required DOM elements. The on-the-fly page object contains the HTML elements, styles, and actions in a combined mode. This is an intermediate representation in certain example embodiments. When it comes to the hardcoding phase, however, HTML, CSS, JS, and/or other hardcoded files may be generated according to the page object. In the event that the user decides to implement a fully-custom responsive page, then separate layout structures for different screens may be generated and potentially combined in a single CSS file in this phase (e.g., as discussed in greater detail below). The created file(s) may be stored to the memory 404 in certain example embodiments. In other example embodiments, the created file(s) may be saved to a network location, published to a website or versioning control system, etc.

Some or all of the following and/or other implementation rules may be enforced in certain example embodiments:
- The on-the-fly page structure follows the "strict binary tree" data structure, where each node has either 0 or exactly two children.
- Each section/division represents a node/object.
- There are two kinds of children, namely, horizontal children and vertical children.
- Consistent with the strict binary tree structure, a node may have either zero or two children.
- The children type will be the same for a single node, meaning that a node may have either zero children, two horizontal children, or two vertical children.
- A child node has at least two properties, namely, height and width. This information may be included in the node representation or linked to therefrom.

Page modularity is advantageous, as noted above. As also alluded to above, it is possible to place native (e.g., DOM-type) elements (e.g., buttons, text, labels, input boxes, check boxes, etc.), as well as composite elements into individual sections and divide the section even further. Any changes of the elements may take place within the affected container section only and, as such, there will be no side effects outside of the "container" section.

Each layout section or page module may be technically implemented with a proper identifier, which will help to further reference each section. This reference identifier may follow a standard naming convention. In this regard, the following rules may be used in certain example embodiments:
- The initial blank page has the id "b" (as in "body").
- A section may have either zero children, or two vertical children, or two horizontal children, so the child identifier will be generated with the parent id, followed by "v" for a vertical child or "h" for a horizontal child.
- As there may be only two immediate children of a section, the child identifier will be appended with "0" for the first child and "1" for the second child.
- This id mechanism or naming convention will be continuing for the nested child of the section. Thus, it is possible to identify the location of an object in the tree from its identifier (and, as a result, reconstruct or make assumptions about a potentially significant portion of the structure from just an identifier).

Figure 5:
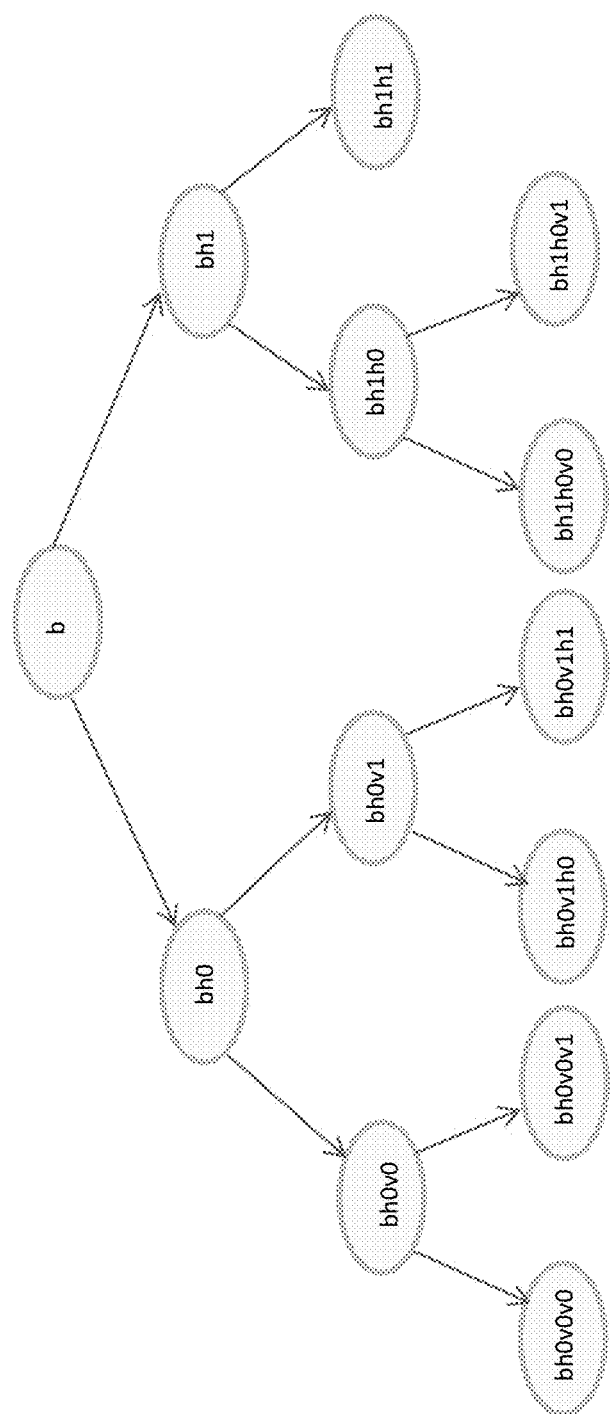
FIG. 5 is an example tree including identifiers showing how a nested page module identifier naming convention may be implemented in connection with certain example embodiments.

In this regard, FIG. 5 is an example tree including identifiers showing how a nested page module identifier naming convention may be implemented in connection with certain example embodiments. The initial blank page section has the id "b". If the user triggers a horizontal division event, then two horizontal sections will be generated, and the identifiers "bh0" and "bh1" will be applied for those two sections. (Alternatively, and not shown in FIG. 5, if the user triggers a vertical division event, then two vertical sections will be generated, and the identifiers "bv0" and "bv1" will be applied for those two sections.) Nested horizontal divisions contain the parent id followed by "h0" and "'h1", and nested vertical division contain the parent id followed by "v0" and "v1". Thus, as shown in the FIG. 5 example, the first horizontal division has two vertical divisions, labeled "bh0v0" and "bh0v1"—with the "bhv0" referring to the parent and grandparent nodes.

Figure 6:
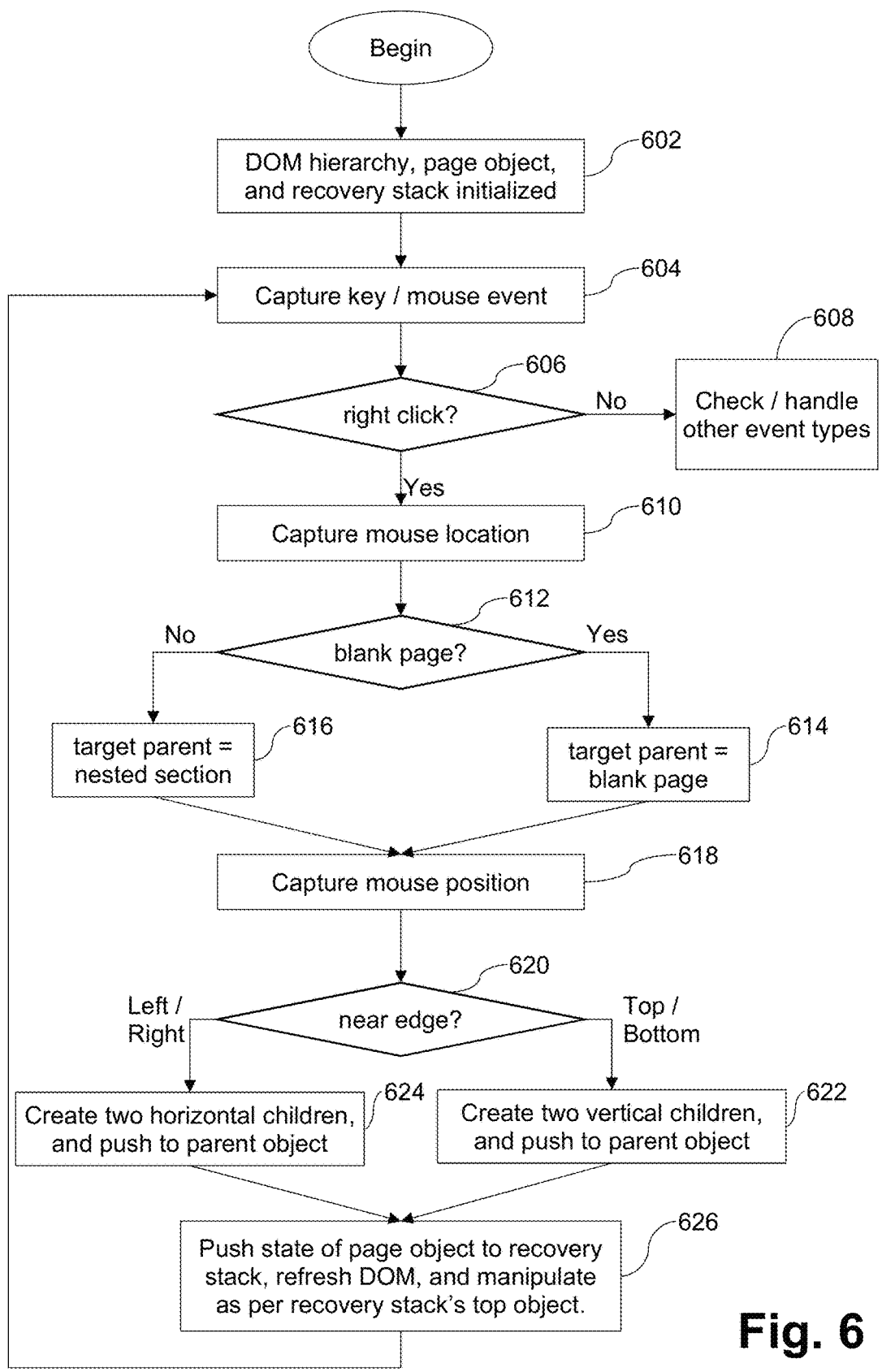
FIG. 6 is a flowchart showing an example process for creating a dynamic layout in accordance with certain example embodiments.

FIG. 6 is a flowchart showing an example process for creating a dynamic layout in accordance with certain example embodiments. In step 602, the DOM hierarchy, page object, and recovery stack are initialized (e.g., set to null, signifying that a new layout is being created). In step 604, an event corresponding to a user using a hardware user interface element (e.g., a mouse, keyboard, and/or the like) is captured and identified as being one of a plurality of predefined event types. Event types may be mapped to specific actions to be taken with respect to the designer application. For example, a right click may correspond to a request to create a new division, a left click may correspond to an indication that a section or element therein should be modified (e.g., that properties of a label should be edited, that a text box should be resized by adjusting height or width, that a color should be changed, etc.), Ctrl-Z may correspond to a request to undo an action, Ctrl-Y may correspond to a request to redo an action, Ctrl-S may correspond to a request to save the progress and transition to the implementation phase, etc. Step 606 determines the type of the event. For the purposes of this example, if the event is not a right click, then the action is checked and handled accordingly in step 608.

If the event is a right click, then the mouse location is captured in step 610. This helps identify what was selected in step 612. For example, if the canvas itself (e.g., a blank page or blank screen) was selected as the target of the new divisions via the right click, then this is noted and the target parent object is designated accordingly in step 614. However, if a given (nested) section was selected as the target of the new divisions via the right click, then this is noted and the target parent is noted accordingly in step 616.

The mouse location is captured in step 618. In this example, the mouse location is used to determine what type of division to create. Predefined criteria may be set for determining the division to create. For example, a vertical division may be created if the click is near the top or bottom edge of the target parent object (e.g., the object corresponding to the canvas or a given section), a horizontal division may be created if the click is near the left or right of the target parent object, etc. "Near" in this sense may be specified as a predetermined distance from an edge. The left/right and top/bottom distances may be the same as or different from one another in different example embodiments. Moreover, the distances may be the same or different for the blank canvas as a whole vis-à-vis a section, in different example embodiments. That distance may be specified in terms of pixels or other absolute distance measure in certain example embodiments. In certain other example embodiments, that distance may be specified in terms of percentages. This percentage may, for example, be specified in terms of a percentage of the width of the identified object in certain example embodiments. Thus, the tolerances for nearness may vary on an object-by-object basis in some instances. This may be advantageous given that a section may be too small for a predefined distance to make sense.

In the FIG. 6 example, if it is determined that the mouse location is near the top or bottom edge of the parent object, then in step 622 two vertical children are created in the DOM for the identified parent object and two vertical sections are shown visually. Similarly, in the FIG. 6 example, if it is determined that the mouse location is near the left or right edge of the parent object, then in step 624 two horizontal children are created in the DOM for the identified parent object and two horizontal sections are shown visually.

In certain example embodiments, it may be necessary or desirable to disambiguate certain activities. For example, it may be necessary or desirable to disambiguate whether the user intended to create a horizontal or vertical division in the event that a right click is provided within a predetermined distance of both the top and left side of a page. Rules may be provided in this regard. For example, a rule may state that a simple prompt is to be provided to request the user to provide clarification. Another rule might be to favor horizontal divisions over vertical divisions (or vice versa). Still another rule might be to set the division based on the lesser of the two distances from the edge (e.g., such that a shorter distance to a left edge compared to a distance to the top prompts a horizontal division rather than a vertical division, even though both are within the predetermined distance, etc.).

In step 626, the state of the page object is pushed to the recovery stack, the DOM object is potentially refreshed, and the visual output and/or intermediate representations are manipulated as per the recovery stack's top object.

Maintaining a recovery stack in this way may be useful for undo/redo operations as noted above. For example, for an undo operation, it may be simply to pop the last action from the top of the stack and refresh the DOM representation and display accordingly. This information may be saved for redo operation, e.g., so that it is merely placed back on the top of the recovery stack, causing the DOM representation and display to be updated/refreshed accordingly. In certain example embodiments, the recovery stack may include a first-in-last-out ordering of elements representing user actions pertaining to section creation and undo and redo user operations.

An end-to-end example will be provided in connection with FIGS. 7A-7E. This example will help demonstrate how sections can be injected dynamically into a parent section and implemented as separate modules throughout their parent section(s). The example involves dynamic insertion of <div> and </div> tags into the DOM. The change is reflected in the console (e.g., visually and in the intermediate format or representation) and in the page object that is used to generate the code.

Figure 7A:
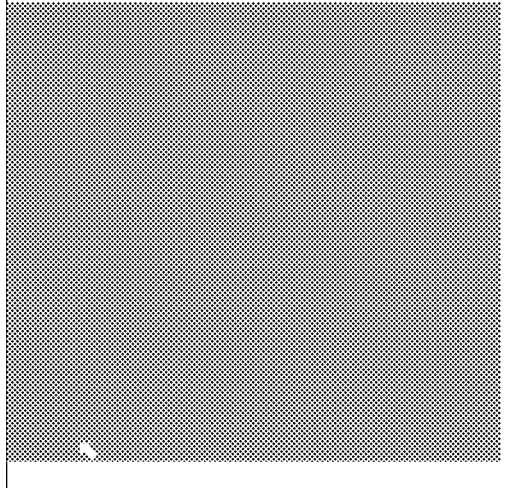
FIGS. 7A-7E show an end-to-end process for creating a complex layout using the techniques of certain example embodiments.

In FIG. 7A, there initially is a blank page, corresponding to the blank page object that has no children. In the console, there is a body tag with an empty division tag. The page object reflects that the single root object occupies 100% of the height and 100% of the width. To obtain one header section, the mouse pointer is placed to the left or right side of the assumed line through which the page will be divided, and the right button on the mouse is clicked. See the arrow placement in FIG. 7A in this regard.

Figure 7B:
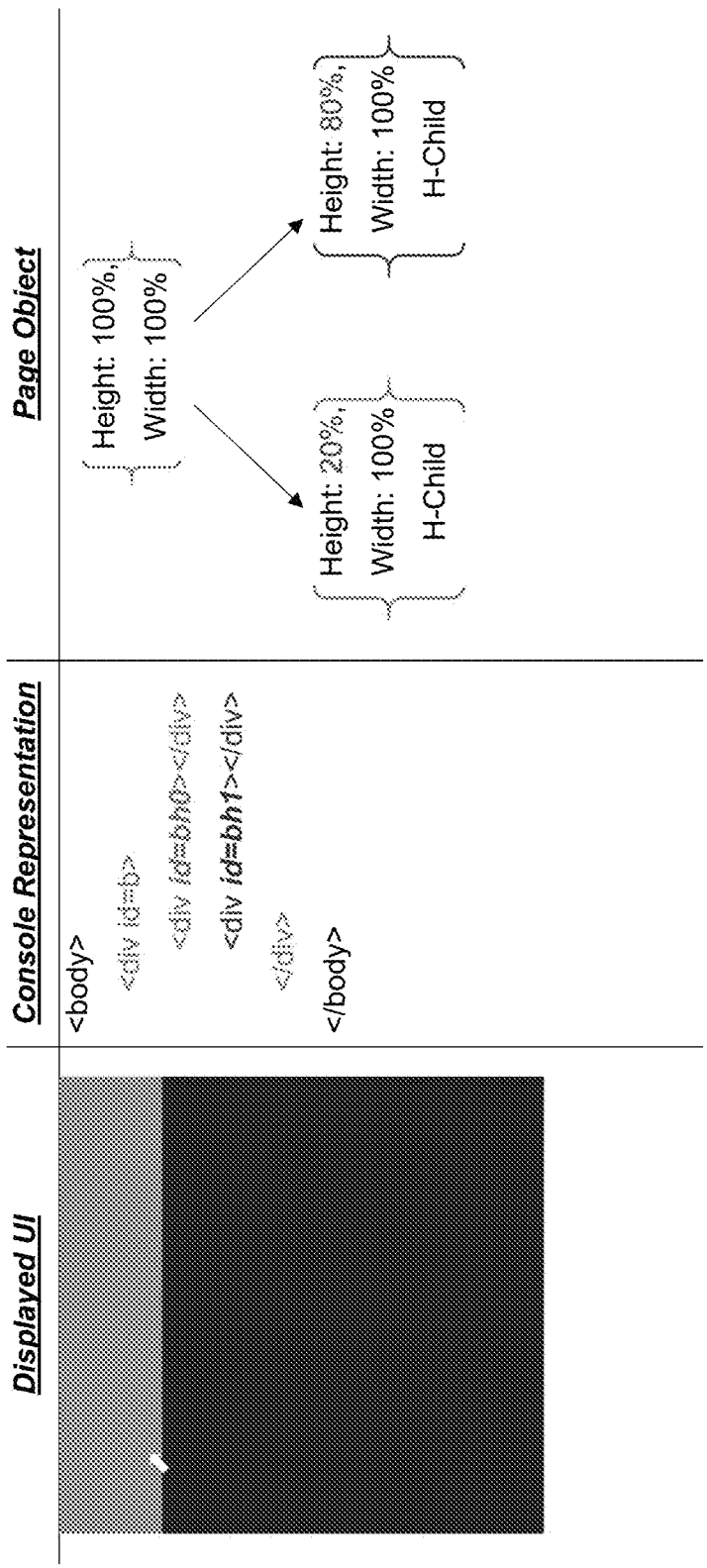

FIG. 7B shows the creation of the two horizontal child objects in the previous blank parent object. The blank page has two horizontal sections. In the console, the empty division tag now has two child divisions. The page object is updated to reflect the two horizontal children. Here, it can be seen that the width of each child is 100% but the height sums to 100%, with the first (upper) division corresponding to the header having less height than the second (lower) division corresponding to the body. To create one logo section in the header, the mouse pointer is placed at the top or bottom side of the assumed line through which the section will be divided, the right button on the mouse is clicked. See the arrow placement in FIG. 7B in this regard.

Figure 7C:
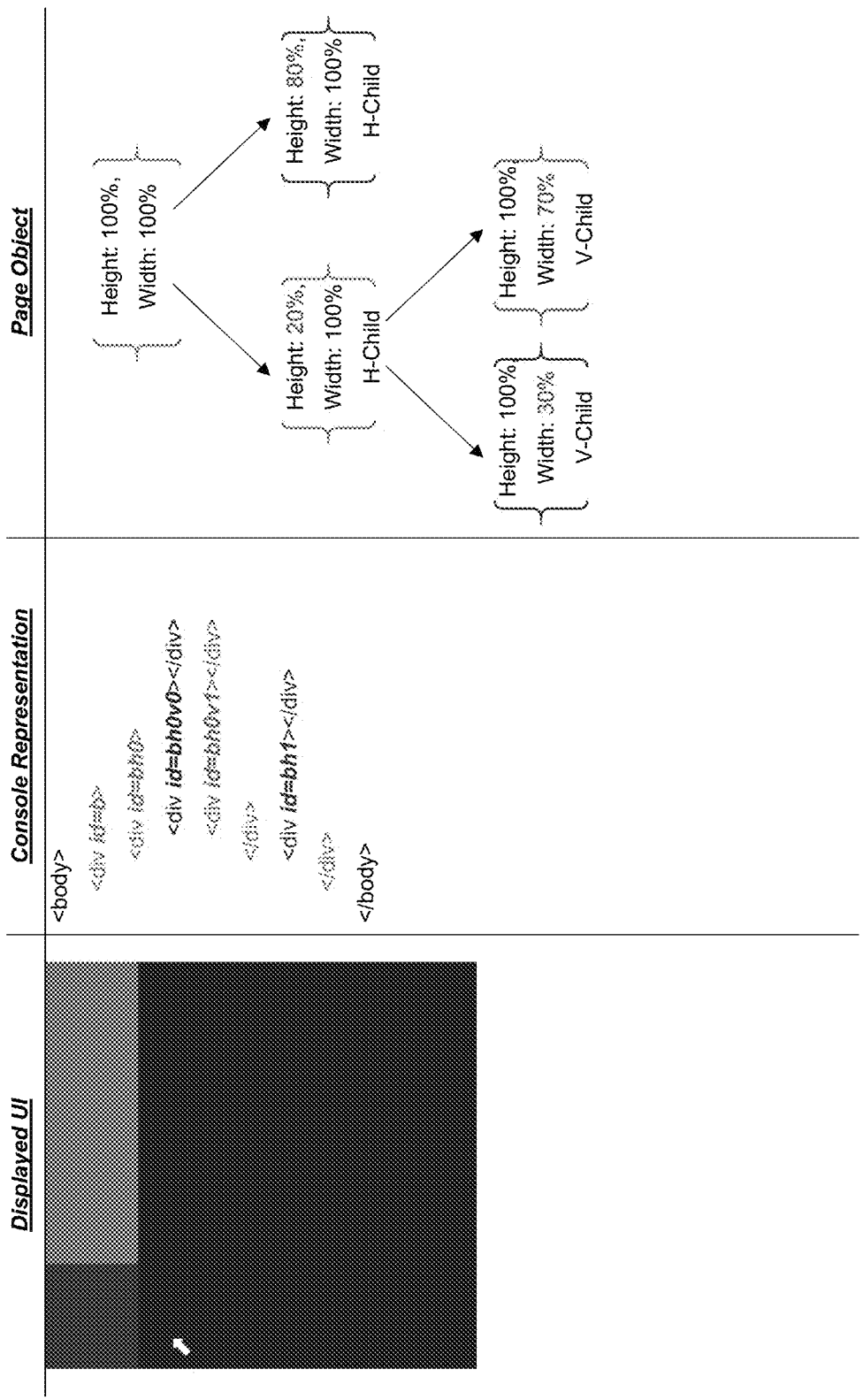

In FIG. 7C, the header section now has two vertical sections, and this is reflected in the console by the header division (id=bh0) having two child divisions. Here, it can be seen that the height of each child is 100% but the width sums to 100%, with the first (left) division corresponding to the area of the header for a smaller logo as compared to the second (right) division in the header. To create a navigation section below the header, the mouse pointer is placed to the left or right side of the assumed line through which the section will be divided, the right button on the mouse is clicked. See the arrow placement in FIG. 7C in this regard.

Figure 7D:
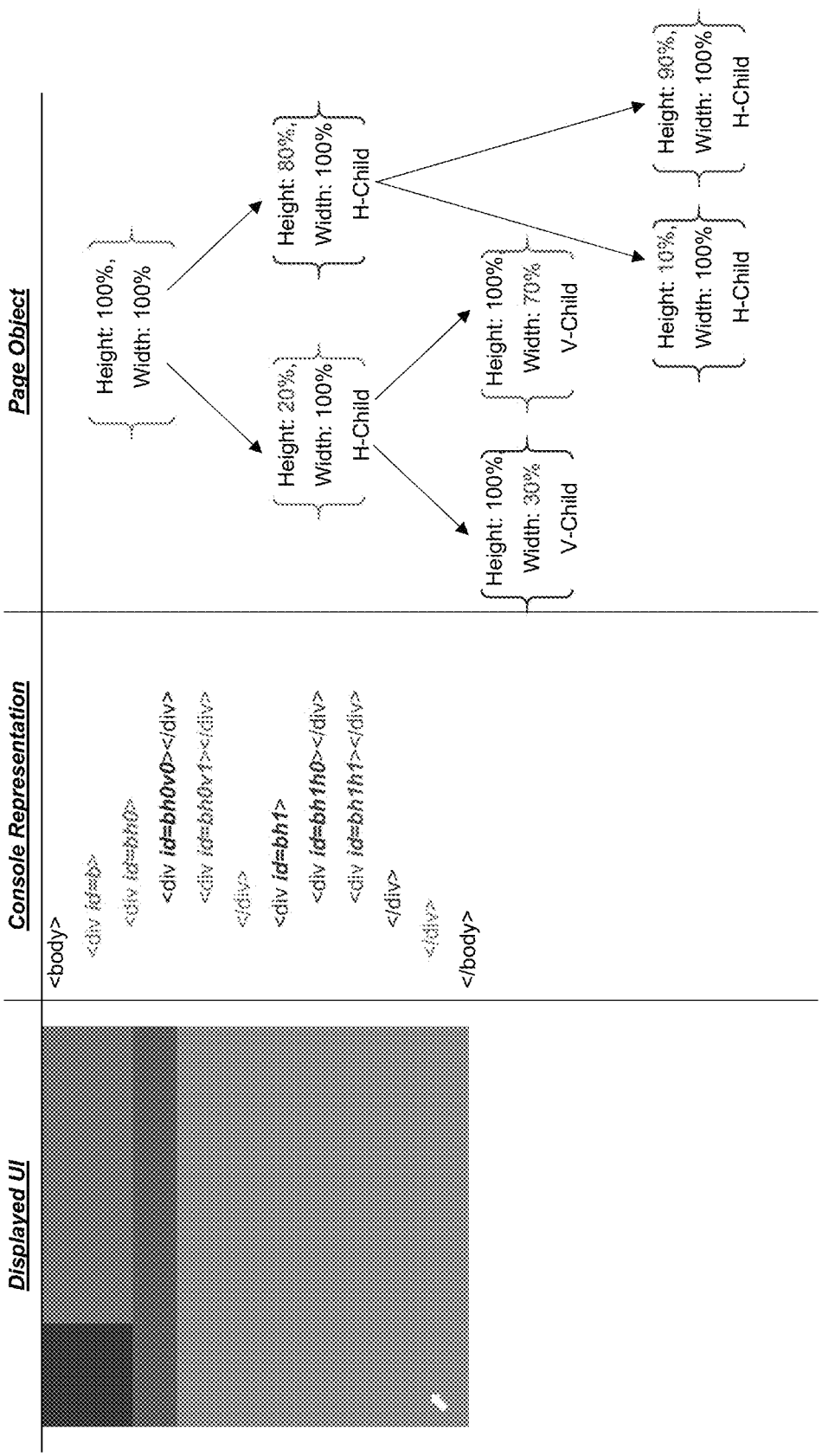
Figure 7E:
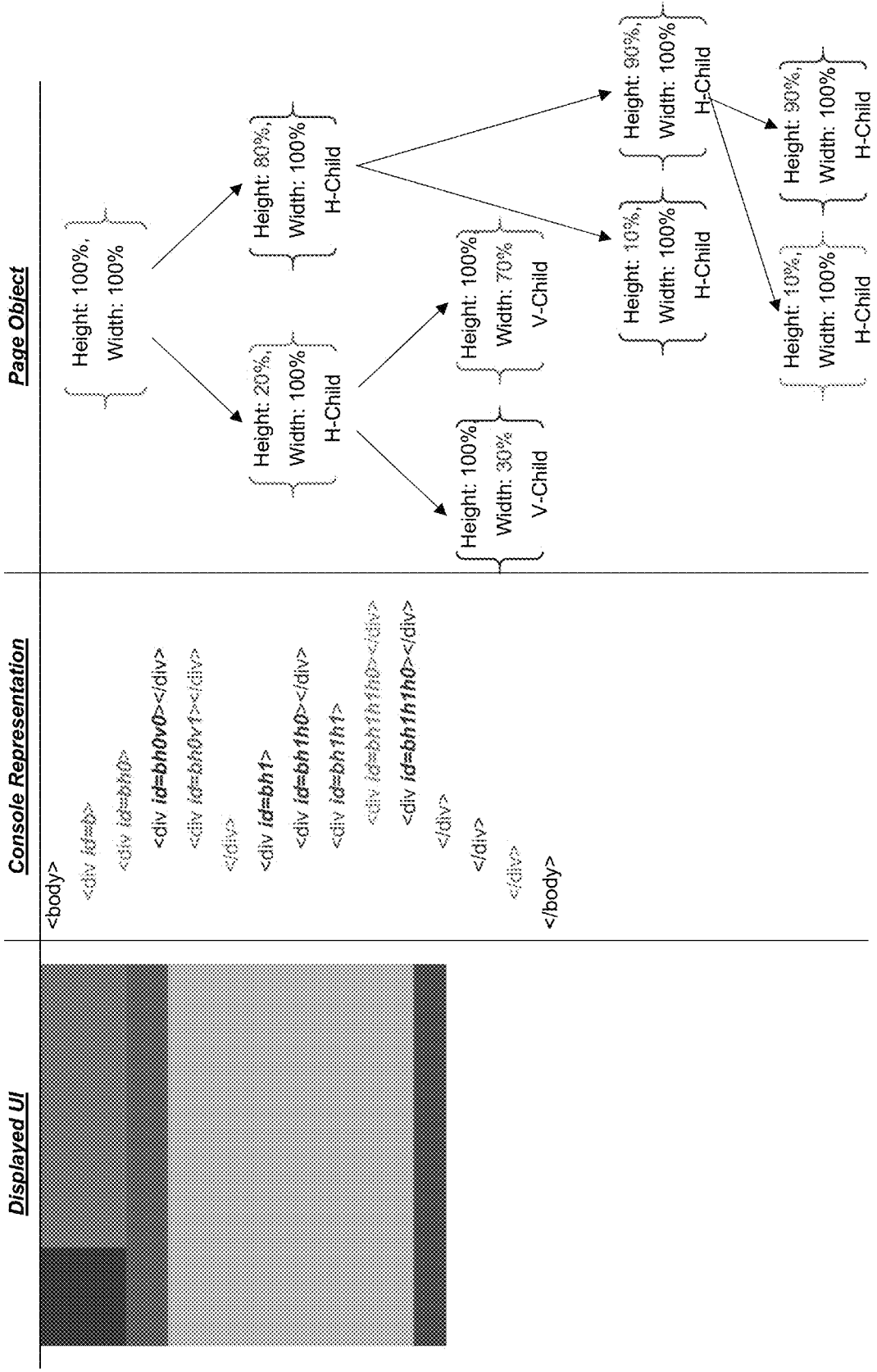

In FIG. 7D, two horizontal child objects are created below the header object, and there correspondingly are two horizontal sections present in the console in the initial lower division (id=bh1). To obtain a footer section on the page, the mouse pointer is placed to the left or right side of the assumed line through which the section will be divided, and the right button on the mouse is clicked. See the arrow placement in FIG. 7D in this regard. In FIG. 7E, a footer area is created in accordance with the above, and the console and page object are updated accordingly.

The page object representations shown in FIGS. 7A-7E have tags indicating whether each object itself is a horizontal object or a vertical object. However, it will be appreciated that these tags in certain example embodiments alternatively or additionally may be applied to parent objects so as to indicate the type of division of their children objects. That is, in certain example embodiments, each page object representation may have one or more tags indicating what type of division that particular page object representation is and/or what type of division its children are. Thus, each page object representation can refer to its type and/or its children's type (if applicable). In a similar vein, each div tag in the console representation may indicate through its ID, and/or other value(s) provided therein, the (division) type of that particular element and/or its children (if applicable). The naming convention may take this into account, in certain example embodiments. In still other examples, these tags need not be applied at all, as they can be inferred from 100% and non-100% values in the height and width properties.

Figures 8, 9:
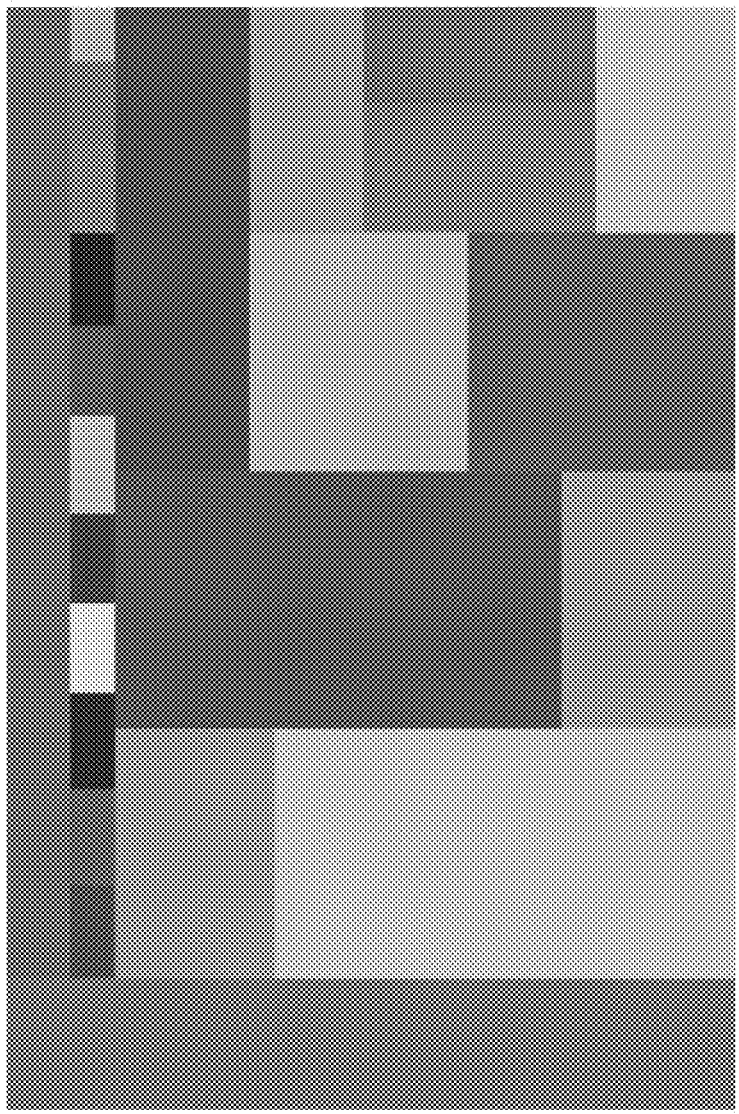
FIG. 8 is an example of a very complex layout created using the techniques of certain example embodiments.
FIG. 9 is a schematic view of a simple page used to help demonstrate how certain example embodiments can efficiently render a page.

It will be appreciated that these techniques can be used to create nested layouts of various different complexities, from the simple layout of FIG. 7B to the very complicated layout of FIG. 8 and potentially beyond.

In certain example embodiments, additional native DOM elements, webpages, and/or the like, may be introduced into the layout during or after division creation. In other words, the user is able to orient additional elements within the structured page being created, using the designer application, as a layout is being created and/or after a layout is finalized.

Certain example embodiments may maintain, as sections are being created and prior to the generation of the code, an intermediate representation of the structured page being created. The intermediate representation, and at least a part of the generated code, may be in an HTML format in certain example embodiments. For instance, each created section in the intermediate representation and in the generated code may be represented in connection with a pair of <div> and </div> tags. In some instances, the intermediate representation of the structured page may include a combination of structural elements and at least one design style, with the generated code at least partially separating the structural elements from the design style(s) in the combination (e.g., such that the styles are included in CSS code).

Using the dynamic layout approach of certain example embodiments, an entire page or section may be considered for calculation. This technique advantageously can offer page modularity, responsiveness, and remove the need for code-based UI development while providing an excellent user experience. Certain example embodiments have been described in connection with pages (e.g., webpages), and it will be appreciated that such webpages may be created for mobile and/or desktop applications, especially when the responsiveness techniques discussed more fully below are implemented. It also will be appreciated that the techniques described herein may be used in connection with other layouts such as, for example, layouts for standalone or other application programs (including Java-based programs, Python-based programs, etc.). Furthermore, although most static and grid-based layout systems are useful for creating simple shapes and frameworks, they tend to require a user to compromise with the provided universe of layouts. The techniques provided herein, however, enable complex structures to be built quite easily. The sections can be generated in nested a manner, implying that a section may contain another section, and so on.

It is known that a single webpage, for example, can be designed in multiple different ways, where the visible output is identical. Consider FIG. 9, for example, which is a schematic view of a simple webpage used to help demonstrate how certain example embodiments can efficiently render a page. FIG. 9 has five sections, arranged horizontally. This layout can be designed in several ways (around 5!/2 or 60 ways). Some ways to create the layout are as follows:

[[S1], [S2], [S3], [S4], [S5]]: All sections are individual divisions.
[[S1], [[S2], [S3], [S4], [S5]]]: S1 is individual, and all others are in a separate division.
[[[S1], [S2]], [[S3], [S4], [S5]]]: S1, S2 are in a division; S3, S4, S5 are in another division.
[[[S1], [S2], [S3]], [[S4], [S5]]]: S1, S2, S3 are in one division; S4, S5 are in another.
[[S1], [[S2], [S3]], [S4], [S5]]: S2, S3 are combined in a division; S1, S4, S5 are separate. Etc.

Different programmers thus may divide the same page in different ways where the resulting output is identical. However, the way the object is rendered is not always efficient.

As noted above, however, certain example embodiments provide for efficient rendering. That rendering may be consistent and deterministic in certain example embodiments. In certain example embodiments, the dynamic layout provides a solution for a single layout structure. Thus, the most efficient way for the design can be determined and implemented. As per the example implementation, set forth above, for example, the layout in the FIG. 9 example will be designed as: [[S1], [[S2], [[S3], [[S4], [S5]]]]]. This "single solution for a single structure" is an advantageous result of the dynamic layout techniques described herein, as is the efficient implementation of the rendering.

As the sections take the entire height and width (100%) of the container section (where the container may be the current device screen or another section), the sections generally will always fit any screen size, since the measurement is relative. Each of the vertical siblings gets 100% height, and the sum of the width is 100%. Each of horizontal siblings gets 100% width, and the sum of the height is 100%. This dynamic calculation of the vertical/horizontal child provides for perfect accommodation. Thus, the technical difficulties associated with designing for different screen sizes is greatly simplified.

In a somewhat related regard, responsiveness is a greater challenge in current UI technologies. When a page is wider than the screen size (either natively or upon a resize operation), then a rearrangement of the page generally is required. This rearrangement of the page according to the screen size is called responsiveness. In the dynamic layout technique of certain example embodiments, the user may implement auto-responsiveness and/or full custom responsiveness.

Existing solutions work on a common approach. That is, whenever the elements (e.g., text, HTML native elements, etc.) cannot fit to the screen row-wise, they are skipped down to the next row/line. There are several approaches for accomplishing this. For example, currently, the flex-layout system implements a 1D (row-wise) solution; CSS-grid layout systems implement a 2D (row-column-wise) solution, which seeks to maintain both rows and columns; and Bootstrap grid systems also handles responsiveness using a "12 columned screen" solution.

Certain example embodiments integrate these and/or other existing responsiveness solutions. For example, this known technology can be user-selected and implemented automatically in an auto-responsiveness feature, meaning that the responsive behavior will be as per the approach of the used technology (e.g., Bootstrap, Flex, CSS, or the like). The code generator of certain example embodiments can help ensure that the corresponding code is generated (e.g., in a CSS or other file).

Figure 10:
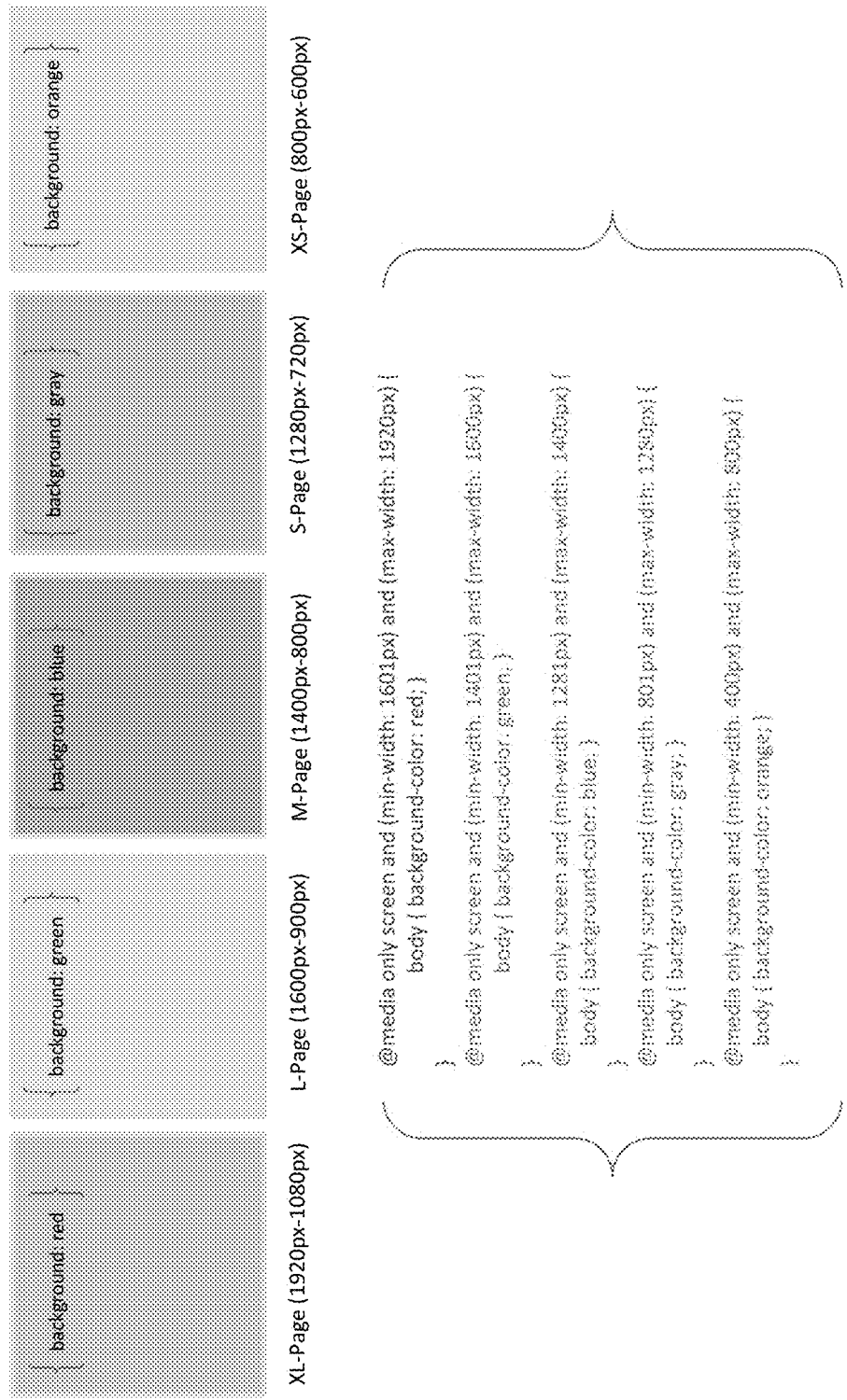
FIG. 10 is a simplified example of how different screen size styles can be combined in a single CSS media query, in accordance with certain example embodiments.

Alternatively, or in addition, if the user wants a totally different structure of the page in terms of the screen size (or other factor such as, for example, device type, etc.), then a multi-page solution may be implemented. For example, the user may design multiple layout structures (e.g., five different layouts for give different screen-size: XL, L, M, S, and XS) for a single page. When the design phase is complete, the hardcoding phase may ensure that these different layout styles are combined into a single style-sheet, e.g., as a CSS media query. In this regard, FIG. 10 is a simplified example of how different screen size styles can be combined in a single CSS media query, in accordance with certain example embodiments. For simplicity, only the background color is defined as varying per the different sized screens, but it will be appreciated that entirely different layouts may be specified, etc.

It will be appreciated from the above that certain example embodiments provide a well-defined organizational approach to creating pages/screens, e.g., in which a non-technical user can develop a UI without any programming knowledge, directly from the UX. The layout is used as an aggregator of relevant elements as per current techniques, but also may help provide modularity to a given page/screen, thereby helping to render elements very efficiently. The modularity provided by certain example embodiments implies that each section of the layout can behave as a separate module and can be handled independently. The benefit is that if any issue occurs in a section, it does not affect the other sections on the page. And after the layout design, when a user inserts elements to the section, then each section can be loaded individually into the DOM. This modularity feature may be used internally without much discernable impact to the end user at design time. This modularity may make integration and maintenance easier in at least some instances. Advantageously, this modularity results from UX interactions more directly and does not require a basis in user-authored code.

It will be appreciated that as used herein, the terms system, subsystem, service, engine, module, programmed logic circuitry, and the like may be implemented as any suitable combination of software, hardware, firmware, and/ or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of creating a structured page, the method comprising:
    initializing a page object corresponding to a document object model;
    receiving operation instructions from a user in connection with a designer application executed by a computing system including at least one processor and a memory, the designer application providing a drawing canvas having upper, lower, left, and right edges, the drawing canvas being displayable via a display operably coupled to the computing system;
    for each received operation instruction, determining whether the respective operation instruction matches one of a plurality of predefined types;
    responsive to a determination that the respective operation instruction matches a first predefined type:
        identifying, based on a first single input location of the respective operation instruction, a predefined section in the drawing canvas in which the first single input location is provided;
        responsive to there being no identified predefined section:
            determining how far from the edges of the drawing canvas the first single input location is provided;
            responsive to a determination that the first single input location is provided within a first distance of the left or right edge of the drawing canvas,
                creating a horizontal division in the drawing canvas, the horizontal division extending across the drawing canvas at a height location corresponding to where the first single input location is provided, the horizontal division creating upper and lower sections in the drawing canvas, and
                adding to the page object new objects corresponding to the upper and lower sections, the new objects having associated therewith respective height and width information; and
            responsive to a determination that the first single input location is provided within a second distance of the upper or lower edge of the drawing canvas,
                creating a vertical division in the drawing canvas, the vertical division extending across the drawing canvas at a width location corresponding to where the first single input location is provided, the vertical division creating left and right sections in the drawing canvas, and
                adding to the page object new objects corresponding to the left and right sections, the new objects having associated therewith respective height and width information; and
        responsive to there being an identified predefined section:
            determining how far from the edges of the identified predefined section the first single input location is provided;
            responsive to a determination that the first single input location is provided within the first distance of the left or right edge of the identified predefined section,
                creating a horizontal division in the identified predefined section, the horizontal division extending across the identified predefined section at a height location corresponding to where the first single input location is provided, the horizontal division creating upper and lower sections in the identified predefined section, and
                adding to the page object, as child objects of the object representing the identified predefined section, new objects corresponding to the upper and lower sections, the new objects having associated therewith respective height and width information; and
            responsive to a determination that the first single input location is provided within a second distance of the upper or lower edge of the identified predefined section,
                creating a vertical division in the identified predefined section, the vertical division extending across the identified predefined section at a width location corresponding to where the first single input location is provided, the vertical division creating left and right sections in the identified predefined section, and
                adding to the page object, as child objects of the object representing the identified predefined section, new objects corresponding to the left and right sections, the new objects having associated therewith respective height and width information; and
    responsive to a determination that the respective operation instruction matches a second predefined type, generating code corresponding to the structured page based on the page object, wherein
    as sections are being created and prior to the generation of the code, an intermediate representation of the structured page is created and changes to the drawing canvas are reflected visually and in the intermediate representation,
    the intermediate representation of the structured page includes a combination of structural elements and at least one design style, and wherein the generated code at least partially separates the structural elements from the design style(s) in the combination, responsive to there being no identified predefined section, the first distance is defined as a percentage of the width of the drawing canvas and the second distance is defined as a percentage of the height of the drawing canvas, and responsive to there being the identified predefined section, the first distance is defined as a percentage of the width of the identified predefined section and the second distance is defined as a percentage of the height of the identified predefined section.

2. The method of claim 1, further comprising prompting for further user input to disambiguate whether to create a horizontal or vertical division and associated objects, responsive to (a) a determination that a single input location of a given operation instruction is provided within the first distance of the left or right edge of the drawing canvas and within the second distance of the upper or lower edge of the drawing canvas, and responsive to (b) a determination that the single input location of the given operation instruction is provided within the first distance of the left or right edge of a given identified predefined section and within the second distance of the upper or lower edge of the given identified predefined section.

3. The method of claim 1, wherein the intermediate representation, and at least a part of the generated code, are in an HTML format.

4. The method of claim 3, further comprising representing each created section in the intermediate representation and in the generated code in connection with a pair of <div> and </div> tags.

5. The method of claim 1, wherein the generated code includes HTML and CSS code.

6. The method of claim 1, further comprising enabling the user to orient additional elements other than the structural elements within the structured page being created, using the designer application.

7. The method of claim 1, wherein the structured page is generated to be automatically responsive to resizing in accordance with a predefined responsiveness approach.

8. The method of claim 1, wherein the structured page is generated to be automatically responsive to resizing in accordance with a custom-defined responsiveness approach, the custom-defined responsiveness approach being defined in connection with a style sheet generated as part of the code generation.

9. The method of claim 1, wherein the page object is maintained as a strict binary tree.

10. The method of claim 9, wherein the objects in the page object are namable in accordance with a naming convention, the naming convention for each non-root object indicating the respective object's parent objects and whether the respective object is a horizontal or vertical section.

11. The method of claim 1, further comprising maintaining a recovery stack, the recovery stack including a first-in-last-out ordering of elements representing user actions pertaining to section creation and undo and redo user operations.

12. A system configured to create a structured page, the system comprising:
a memory storing a page object from which the structured page is to be generated; and
at least one processor configured to:
initialize the page object corresponding to a document object model;
receive operation instructions from a user in connection with a designer application executed by a computing system including at least one processor and a memory, the designer application providing a drawing canvas having upper, lower, left, and right edges, the drawing canvas being displayable via a display operably coupled to the computing system;
for each received operation instruction, determining whether the respective operation instruction matches one of a plurality of predefined types;
responsive to a determination that the respective operation instruction matches a first predefined type:
identifying, based on a first single input location of the respective operation instruction, a predefined section in the drawing canvas in which the first single input location is provided;
responsive to there being no identified predefined section:
determining how far from the edges of the drawing canvas the first single input location is provided;
responsive to a determination that the first single input location is provided within a first distance of the left or right edge of the drawing canvas, creating a horizontal division in the drawing canvas, the horizontal division extending across the drawing canvas at a height location corresponding to where the first single input location is provided, the horizontal division creating upper and lower sections in the drawing canvas, and adding to the page object new objects corresponding to the upper and lower sections, the new objects having associated therewith respective height and width information; and
responsive to a determination that the first single input location is provided within a second distance of the upper or lower edge of the drawing canvas, creating a vertical division in the drawing canvas, the vertical division extending across the drawing canvas at a width location corresponding to where the first single input location is provided, the vertical division creating left and right sections in the drawing canvas, and adding to the page object new objects corresponding to the left and right sections, the new objects having associated therewith respective height and width information; and
responsive to there being an identified predefined section:
determining how far from the edges of the identified predefined section the first single input location is provided;
responsive to a determination that the first single input location is provided within the first distance of the left or right edge of the identified predefined section, creating a horizontal division in the identified predefined section, the horizontal division extending across the identified predefined section at a height location corresponding to where the first single input location is provided, the horizontal division creating upper and lower sections in the identified predefined section, and adding to the page object, as child objects of the object representing the identified predefined section, new objects corresponding to the upper and lower sections, the new objects having associated therewith respective height and width information; and responsive to a determination that the first single input location is provided within a second distance of the upper or lower edge of the identified predefined section, creating a vertical division in the identified predefined section, the vertical division extending across the identified predefined section at a width location corresponding to where the first single input location is provided, the vertical division creating left and right sections in the identified predefined section, and adding to the page object, as child objects of the object representing the identified predefined section, new objects corresponding to the left and right sections, the new objects having associated therewith respective height and width information; and responsive to a determination that the respective operation instruction matches a second predefined type, generating code corresponding to the structured page based on the page object, wherein as sections are being created and prior to the generation of the code, an intermediate representation of the structured page is created and changes to the drawing canvas are reflected visually and in the intermediate representation, the intermediate representation of the structured page includes a combination of structural elements and at least one design style, and wherein the generated code at least partially separates the structural elements from the design style(s) in the combination, responsive to there being no identified predefined section, the first distance is defined as a percentage of the width of the drawing canvas and the second distance is defined as a percentage of the height of the drawing canvas, and responsive to there being the identified predefined section, the first distance is defined as a percentage of the width of the identified predefined section and the second distance is defined as a percentage of the height of the identified predefined section.

13. The system of claim 12, wherein:
wherein the page object is maintained as a strict binary tree.

14. The system of claim 13, wherein the objects in the page object are namable in accordance with a naming convention, the naming convention for each non-root object indicating the respective object's parent objects and whether the respective object is a horizontal or vertical section.

15. The method of claim 1, wherein the first single input location corresponds to a single mouse location.

16. The method of claim 1, wherein the first single input location corresponds to a single location of a cursor.

17. The method of claim 1, wherein the first single input location corresponds to a single click input operation to a mouse operated by the user.

18. A non-transitory computer readable storage medium comprising instructions that, when executed by a computer system including at least one processor and a memory, cause the computer system to provide execution comprising:

initializing a page object corresponding to a document object model;

receiving operation instructions from a user in connection with a designer application executed by a computing system including at least one processor and a memory, the designer application providing a drawing canvas having upper, lower, left, and right edges, the drawing canvas being displayable via a display operably coupled to the computing system;

for each received operation instruction, determining whether the respective operation instruction matches one of a plurality of predefined types;

responsive to a determination that the respective operation instruction matches a first predefined type:

identifying, based on a first single input location of the respective operation instruction, a predefined section in the drawing canvas in which the first single input location is provided;

responsive to there being no identified predefined section:

determining how far from the edges of the drawing canvas the first single input location is provided;

responsive to a determination that the first single input location is provided within a first distance of the left or right edge of the drawing canvas, creating a horizontal division in the drawing canvas, the horizontal division extending across the drawing canvas at a height location corresponding to where the first single input location is provided, the horizontal division creating upper and lower sections in the drawing canvas, and adding to the page object new objects corresponding to the upper and lower sections, the new objects having associated therewith respective height and width information; and responsive to a determination that the first single input location is provided within a second distance of the upper or lower edge of the drawing canvas, creating a vertical division in the drawing canvas, the vertical division extending across the drawing canvas at a width location corresponding to where the first single input location is provided, the vertical division creating left and right sections in the drawing canvas, and adding to the page object new objects corresponding to the left and right sections, the new objects having associated therewith respective height and width information; and responsive to there being an identified predefined section:

determining how far from the edges of the identified predefined section the first single input location is provided;

responsive to a determination that the first single input location is provided within the first distance of the left or right edge of the identified predefined section, creating a horizontal division in the identified predefined section, the horizontal division extending across the identified predefined section at a height location corresponding to where the first single input location is provided, the horizontal division creating upper and lower sections in the identified predefined section, and adding to the page object, as child objects of the object representing the identified predefined section, new objects corresponding to the upper and lower sections, the new objects having associated therewith respective height and width information; and responsive to a determination that the first single input location is provided within a second distance of the upper or lower edge of the identified predefined section, creating a vertical division in the identified predefined section, the vertical division extending across the identified predefined section at a width location corresponding to where the first single input location is provided, the vertical division creating left and right sections in the identified predefined section, and adding to the page object, as child objects of the object representing the identified predefined section, new objects corresponding to the left and right sections, the new objects having associated therewith respective height and width information; and responsive to a determination that the respective operation instruction matches a second predefined type, generating code corresponding to the structured page based on the page object, wherein as sections are being created and prior to the generation of the code, an intermediate representation of the structured page is created and changes to the drawing canvas are reflected visually and in the intermediate representation, the intermediate representation of the structured page includes a combination of structural elements and at least one design style, and wherein the generated code at least partially separates the structural elements from the design style(s) in the combination, responsive to there being no identified predefined section, the first distance is defined as a percentage of the width of the drawing canvas and the second distance is defined as a percentage of the height of the drawing canvas, and responsive to there being the identified predefined section, the first distance is defined as a percentage of the width of the identified predefined section and the second distance is defined as a percentage of the height of the identified predefined section.

19. The non-transitory computer readable storage medium of claim 18, wherein the computer system is further caused to provide execution comprising prompting for further user input to disambiguate whether to create a horizontal or vertical division and associated objects, responsive to (a) a determination that a single input location of a given operation instruction is provided within the first distance of the left or right edge of the drawing canvas and within the second distance of the upper or lower edge of the drawing canvas, and responsive to (b) a determination that the single input location of the given operation instruction is provided within the first distance of the left or right edge of a given identified predefined section and within the second distance of the upper or lower edge of the given identified predefined section.

20. The non-transitory computer readable storage medium of claim 18, wherein the intermediate representation, and at least a part of the generated code, are in an HTML format.

21. The non-transitory computer readable storage medium of claim 20, wherein each created section is represented in the intermediate representation and in the generated code in connection with a pair of <div> and </div> tags.

22. The non-transitory computer readable storage medium of claim 18, wherein the generated code includes HTML and CSS code.

23. The non-transitory computer readable storage medium of claim 18, wherein the computer system is further caused to provide execution comprising enabling the user to orient additional elements other than the structural elements within the structured page being created, using the designer application.

24. The non-transitory computer readable storage medium of claim 18, wherein the structured page is generated to be automatically responsive to resizing in accordance with a predefined responsiveness approach.

25. The non-transitory computer readable storage medium of claim 18, wherein the structured page is generated to be automatically responsive to resizing in accordance with a custom-defined responsiveness approach, the custom-defined responsiveness approach being defined in connection with a style sheet generated as part of the code generation.

26. The non-transitory computer readable storage medium of claim 18, wherein the page object is maintained as a strict binary tree.

27. The non-transitory computer readable storage medium of claim 26, wherein the objects in the page object are namable in accordance with a naming convention, the naming convention for each non-root object indicating the respective object's parent objects and whether the respective object is a horizontal or vertical section.

28. The non-transitory computer readable storage medium of claim 18, wherein the computer system is further caused to provide execution comprising maintaining a recovery stack, the recovery stack including a first-in-last-out ordering of elements representing user actions pertaining to section creation and undo and redo user operations.

* * * * *